United States Patent
Iwasaka et al.

(10) Patent No.: US 8,239,099 B2
(45) Date of Patent: Aug. 7, 2012

(54) LANE DEVIATION PREVENTION CONTROLLER

(75) Inventors: Takeshi Iwasaka, Odawara (JP); Kou Satou, Atsugi (JP)

(73) Assignee: Nissan Motor Co., Ltd., Kanagawa (JP)

( * ) Notice: Subject to any disclaimer, the term of this patent is extended or adjusted under 35 U.S.C. 154(b) by 1006 days.

(21) Appl. No.: 12/143,102

(22) Filed: Jun. 20, 2008

(65) Prior Publication Data

US 2009/0005934 A1    Jan. 1, 2009

(30) Foreign Application Priority Data

Jun. 28, 2007    (JP) .................... 2007-170719

(51) Int. Cl.
*B62D 6/00*    (2006.01)
*G05D 1/00*    (2006.01)

(52) U.S. Cl. ............... 701/42; 701/45; 348/119
(58) Field of Classification Search ........... 701/1, 42, 701/45, 301; 340/425.5, 436; 180/168, 170; 348/119
See application file for complete search history.

(56) References Cited

U.S. PATENT DOCUMENTS

| | | | |
|---|---|---|---|
| 2003/0014162 A1* | 1/2003 | Sadano | 701/1 |
| 2004/0010371 A1* | 1/2004 | Matsumoto et al. | 701/300 |
| 2004/0098197 A1 | 5/2004 | Matsumoto et al. | |
| 2005/0177308 A1* | 8/2005 | Tange et al. | 701/301 |
| 2005/0267661 A1* | 12/2005 | Iwazaki et al. | 701/41 |

FOREIGN PATENT DOCUMENTS

| | | |
|---|---|---|
| EP | 1674361 A1 | 6/2006 |
| JP | 2002002427 A | 1/2002 |
| JP | 2003 112540 | 4/2003 |
| JP | 2003154910 A | 5/2003 |
| JP | 2005-182243 A | 7/2005 |

OTHER PUBLICATIONS

European Search Report for EP Application No. 08158730.5-2423, dated Jul. 5, 2010 (4 pages).
Patent Abstracts of Japan, Publication No. 2003-112540, Publication Date Apr. 15, 2003, 1 page.
Office Action in Japanese Patent Application No. 2007-170719, dated Sep. 14, 2010 (5 pages).
Concise Explanation of Relevance of Japanese Office Action dated Sep. 14, 2010 in Japanese Patent Application No. 2007-170719 (1 page).

* cited by examiner

*Primary Examiner* — John Nguyen
*Assistant Examiner* — Brian J Broadhead
(74) *Attorney, Agent, or Firm* — Osha Liang LLP (57) ABSTRACT

A deviation controller to prevent deviation of a vehicle from a lane of travel includes a displacement estimator configured to estimate a future lateral displacement of the vehicle with respect to the lane of travel, a detecting device configured to detect a tendency of the vehicle to deviate from the lane of travel, a prevention controller configured to apply a yaw moment to correct a travel path of the vehicle when the tendency of the vehicle to deviate from the lane of travel is detected, a correction canceling device configured to cancel the yaw moment of the prevention controller when a steering angle exceeds a canceling threshold, and a threshold adjusting device configured to adjust the canceling threshold in response to the estimated future lateral displacement.

14 Claims, 6 Drawing Sheets

LANE DEVIATION PREVENTION CONTROLLER

CROSS-REFERENCE TO RELATED APPLICATIONS

The present application claims priority from Japanese Patent Application No. 2007-170719, filed Jun. 28, 2007. The contents of the priority application are hereby incorporated by reference in their entirety.

BACKGROUND OF THE DISCLOSURE

1. Field of the Disclosure

The present disclosure relates to lane deviation prevention controllers.

2. Description of the Related Art

When a tendency of a vehicle to deviate from a lane of travel is detected, a yaw moment may be generated by a difference in braking force between the left and right wheels, such that the vehicle's travel path is corrected. In this case, when the steering angle exceeds a prescribed level, it is determined that the deviation is an intentional lane change, and the deviation prevention control (i.e., the application of a yaw moment) is cancelled. One example is Japanese Kokai Patent Application No. 2003-112540.

However, when lateral acceleration is generated by the yaw moment, the driver's body may shift, and a load may be transmitted to the steering wheel. As a result, the deviation prevention control may be cancelled when the steering angle exceeds a prescribed value, even if the driver did not intentionally attempt a steering operation, such as a lane change.

SUMMARY OF THE CLAIMED SUBJECT MATTER

In one aspect, the present disclosure relates to a deviation controller to prevent deviation of a vehicle from a lane of travel including a detecting device configured to detect a tendency of the vehicle to deviate from the lane of travel, a prevention controller configured to apply a yaw moment to correct a travel path of the vehicle when the tendency of the vehicle to deviate from the lane of travel is detected, a correction canceling device configured to cancel the yaw moment of the prevention controller when a steering angle exceeds a canceling threshold, and a threshold adjusting device configured to adjust the canceling threshold in response to the yaw moment applied by the prevention controller.

In another aspect, the present disclosure relates to a deviation controller to prevent deviation of a vehicle from a lane of travel including a displacement estimator configured to estimate a future lateral displacement of the vehicle with respect to the lane of travel, a detecting device configured to detect a tendency of the vehicle to deviate from the lane of travel, a prevention controller configured to apply a yaw moment to correct a travel path of the vehicle when the tendency of the vehicle to deviate from the lane of travel is detected, a correction canceling device configured to cancel the yaw moment of the prevention controller when a steering angle exceeds a canceling threshold, and a threshold adjusting device configured to adjust the canceling threshold in response to the estimated future lateral displacement.

In another aspect, the present disclosure relates to a method to prevent deviation of a vehicle from a lane of travel including estimating a future lateral displacement of the vehicle with respect to the lane of travel, detecting a tendency of the vehicle to deviate from the lane of travel, applying a yaw moment to correct a travel path of the vehicle in response to the detected tendency to deviate from the lane of travel, canceling the applied yaw moment when a steering angle of the vehicle exceeds a canceling threshold, adjusting the canceling threshold in response to the estimated future lateral displacement.

In another aspect the present disclosure relates to a deviation controller to prevent deviation of a vehicle from a lane of travel including an estimating means for estimating a future lateral displacement of the vehicle with respect to the lane of travel, a detecting means for detecting a tendency of the vehicle to deviate from the lane of travel, a controller means for applying a yaw moment to correct a travel path of the vehicle when the tendency of the vehicle to deviate from the lane of travel is detected, a correction means for canceling the yaw moment of the controller means when a steering angle exceeds a canceling threshold, and an adjusting means for adjusting the canceling threshold in response to the estimated future lateral displacement.

In another aspect, the present disclosure relates to a vehicle control system, including a detecting device to detect a tendency of the vehicle to deviate from a lane of travel, a prevention controller configured to apply a yaw moment to correct a travel path of the vehicle when the tendency to deviate from the lane of travel is detected, a correction canceling device configured to cancel the yaw moment of the prevention controller when a steering angle exceeds a canceling threshold, and a threshold adjusting device configured to adjust the canceling threshold in response to the yaw moment applied by the prevention controller.

BRIEF DESCRIPTION OF DRAWINGS

Features of the present disclosure will become more apparent from the following description in conjunction with the accompanying drawings.

DETAILED DESCRIPTION

In the following, an embodiment of the present disclosure will be explained with reference to figures.

Figure 1:
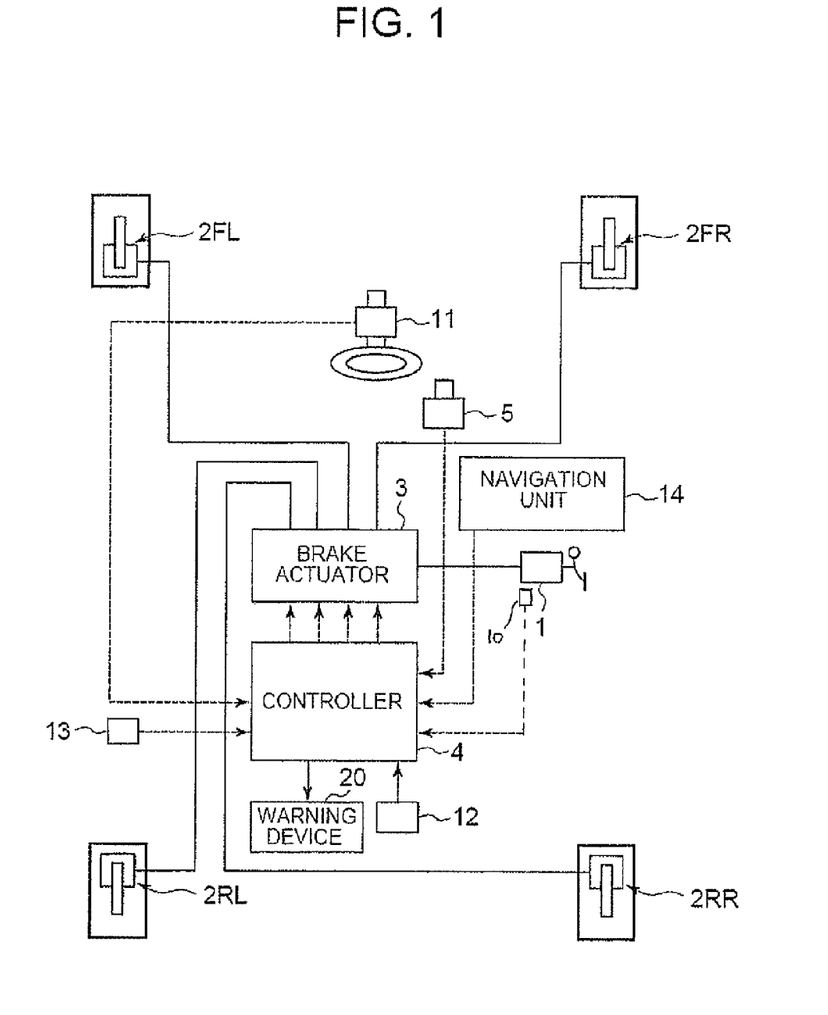
FIG. 1 is a schematic diagram illustrating the constitution of the vehicle.

FIG. 1 is a schematic diagram illustrating the constitution of an embodiment in accordance with the present disclosure. In this case, brake actuator 3 for stability control (VDC: Vehicle Dynamics Control) or the like may be arranged between a master cylinder 1 and various wheel cylinders 2i (where i=FL, FR, RL, and RR). Brake actuator 3 may include solenoid valves, pumps, and other hydraulic devices. By controlling these during driving with a controller 4, the hydraulic pressure of each of the various wheel cylinders 2i may be individually controlled irrespective of the braking operations of the driver.

Also, a camera 5 may be provided for taking pictures ahead of the vehicle. Based on the captured image data, an image processor (not shown), may recognize lane markers (e.g., white lines) so as to detect the lane of travel and compute a yaw angle Ø of the vehicle with respect to the lane of travel. Furthermore, the image processor may also calculate lateral displacement X from the center of the lane of travel and curvature ρ of the lane of travel. Image processor may send the various signals (e.g., Ø, X, and ρ) to controller 4. When there are no lane markers on the road, the lane of travel may be estimated based on the road edge, guard rails, curbs, etc.

Also, master cylinder pressure Pm may be detected with pressure sensor 10, steering angle δ detected with steering angle sensor 1, various wheel velocities Vwi detected with wheel velocity sensors 12, and the operational state of direction indicating switch 13, such as a turn signal, may also be input to controller 4. In addition, longitudinal acceleration Yg, lateral acceleration Xg, yaw rate Ø', and road information may be acquired from navigation device 14 and input to controller 4.

When said data have left/right directionality, the left direction may be taken as having a positive value, while the right direction may be taken as having a negative value. That is, for said yaw angle Ø and steering angle δ, the leftward rotation may be taken as having a positive value and rightward rotation may have a negative value. For said lateral displacement X, deviation to the left from the center of the lane of travel may be taken as having a positive value and deviation to the right may have a negative value.

A warning device 20 may also provided. It generates a warning sound or turns ON a warning light corresponding to the warning signal output from controller 4.

Figure 2:
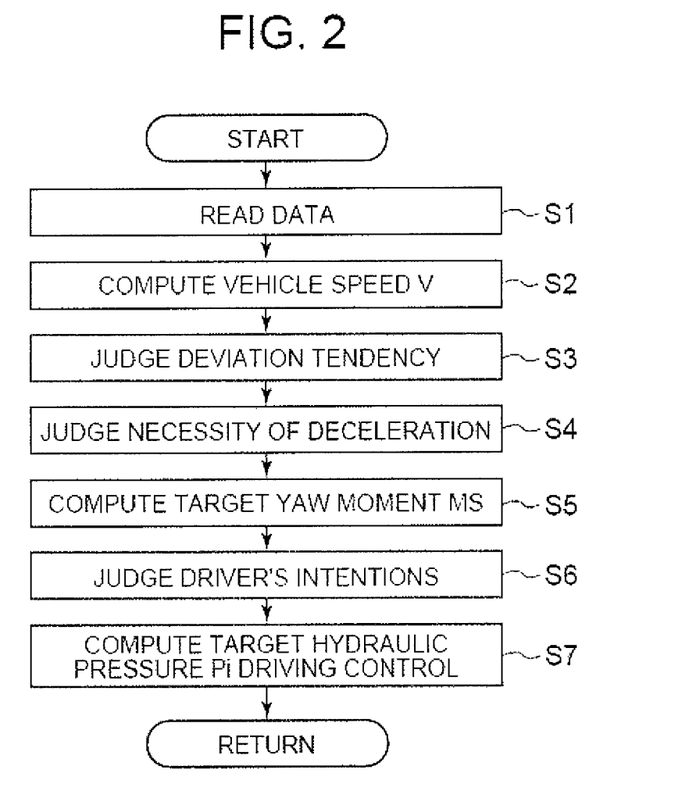
FIG. 2 is a flow chart illustrating the deviation prevention control.

In the following, the arithmetic and logic operations performed by controller 4, with a timer interrupt for each prescribed interval, will be explained with respect to the flow chart shown in FIG. 2.

First, the various types of data (e.g., Ø, X, ρ, Pm, and Vwi) described above may be read in step S1. Next, in step S2, as shown below, the vehicle speed V may be computed as the mean wheel velocity of the non-driving wheels (i.e., the slave wheels). Alternatively, vehicle speed V may be obtained from an anti-skid control or a navigation (i.e., GPS) device.

In case of front wheel drive:

$$V=(V_{wRL}+V_{wRR})/2 \tag{Eq. 1}$$

In case of rear wheel drive:

$$V=(V_{wFL}+V_{wFR})/2 \tag{Eq. 2}$$

(Here, VwRL represents the wheel velocity of the left rear wheel, VwRR represents the wheel velocity of the right rear wheel, VwFL represents the wheel velocity of the left front wheel, and VwFR represents the wheel velocity of the right front wheel).

Then, step S3 may determine the tendency of the vehicle to deviate from the lane of travel.

As shown below, the estimated amount of lateral displacement from the center of the lane after vehicle headway time Tt has elapsed may be computed as estimated lateral displacement Xs. Here the vehicle headway time may be obtained by dividing a prescribed forward observation distance by vehicle speed V.

$$Xs=Tt \times V \times (\emptyset + Tt \times V \times \rho) + X \tag{Eq. 3}$$

Then a determination may be made as to whether estimated lateral displacement |Xs| equals or exceeds threshold XL. If the judgment result is that |Xs|<XL, the deviation flag Fd may be set 0. If the judgment result is that |Xs|≧XL, the deviation flag Fd may be set at 1. In this case, the deviation direction may also detected from the magnitude (i.e., the "sign" or "±") of estimated lateral displacement Xs.

For example, threshold XL may be computed as follows. The lane width may be designated L, and the vehicle body width H. Said lane width L may be obtained from the captured image data or the navigation information.

$$XL=(L-H)/2 \tag{Eq. 4}$$

Then, a judgment may be made in step S4 as to whether the vehicle should be decelerated.

Here, a judgment may be made as to whether the difference between estimated lateral displacement Xs and threshold XL, ΔX(=|Xs−XL|), exceeds the threshold Xa. If the judgment result is that ΔX<Xa, it may be determined that deceleration of the vehicle is not needed, and the deceleration flag Fr is set at 0. On the other hand, if the judgment result is that ΔX≧Xa, it may be determined that deceleration of the vehicle is necessary, and the deceleration flag Fr is set at 1.

Figure 3:
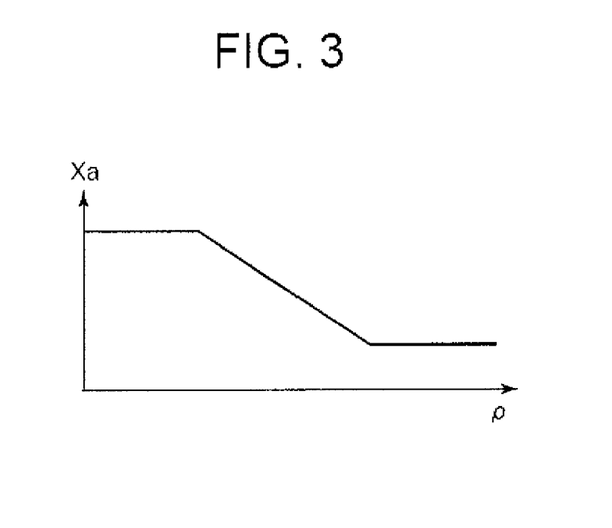
FIG. 3 is a map for computing threshold Xa with respect to ρ.

Threshold Xa may be set according to curvature ρ of the lane of travel with reference to the map shown in FIG. 3. That is, the larger the curvature ρ, the smaller the threshold Xa.

Next, target yaw moment Ms may be computed in step S5. When deviation flag Fd=0, the target yaw moment Ms is set to zero (i.e., Ms=0).

Figure 4:
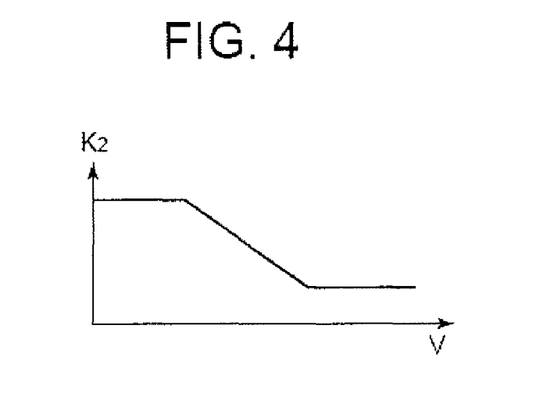
FIG. 4 is a map for computing gain K2 with respect to V.

On the other hand, when deviation flag Fd=1, it may be computed as follows. Here, K1 is the gain determined from the various parameters of the vehicle and K2 is the gain determined corresponding to vehicle speed V. For example, as shown in FIG. 4, the higher the vehicle speed V, the smaller the value of K2.

$$Ms=K1 \times K2 \times (|Xs|-XL) \tag{Eq. 5}$$

Then, in step S6, a determination may be made as to the intention of the driver to change lanes.

When said direction indicating switch is ON, a determination may be made as to whether the indicated direction matches the deviation direction. If YES, it may be judged that the lane change is intended, and the deviation flag Fd is set at 0. If NO, it may be judged that the lane change is unintended, and the existing deviation flag Fd is maintained.

On the other hand, when said direction indicating switch is OFF, a judgment may be made as to whether steering angle |θ| exceeds a threshold θs. If the judgment result is |θ|≧θs, it may be determined that the lane change is intended by the driver, and the deviation flag Fd is set at 0. If the judgment result is |θ|<θs, it may be judged that the lane change is not intended by the driver, and the existing deviation flag Fd is maintained.

Figure 5:
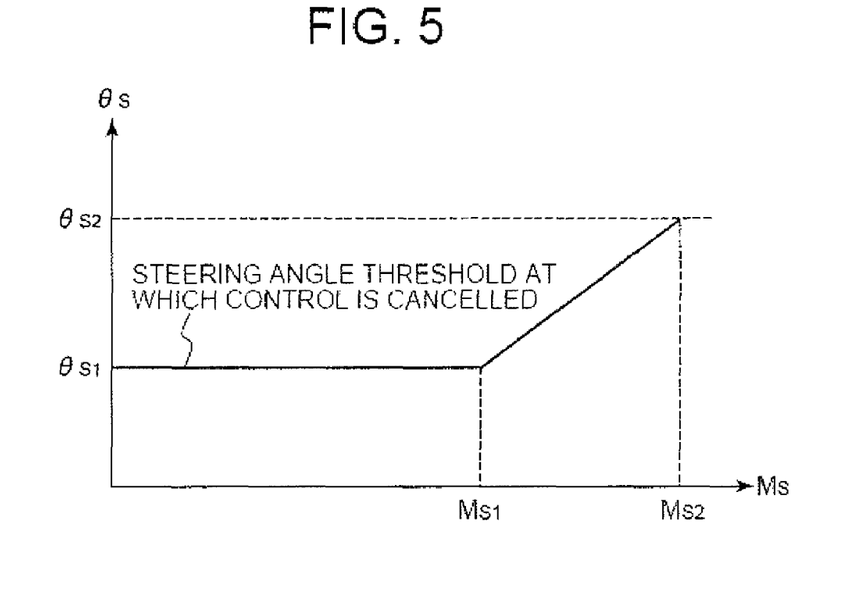
FIG. 5 is a map for computing threshold θs with respect to Ms.

Threshold θs may be set corresponding to target yaw moment Ms with reference to the map shown in FIG. 5. Threshold θs may remain constant when target yaw moment Ms is too small to cause a shift in the driver's weight. When the target yaw moment Ms reaches a magnitude Ms1 which may cause a shift in the driver's weight, threshold θs may be adjusted based on the magnitude of target yaw moment Ms. That is, the larger the target yaw moment Ms, the larger the threshold θs may be. Here, a map shows the threshold θs may be adjusted as a linear variation with respect to variation in Ms. A map may also be adopted with the variation of threshold θs following a curve or in a stepwise variation. A map may also be adopted having multiple variation types (e.g., exponential, logarithmic, linear, etc.).

Target hydraulic pressures PFL to PRR for the various wheel cylinders may be computed in step S7. First, if deviation flag Fd=0, it may be determined that there is no tendency of the vehicle to deviate, driving of brake actuator 3 may be turned OFF, and as shown below, the master cylinder pressure is fed to each wheel cylinder. Here, Pmr may be the rear-wheel master cylinder pressure based on the ideal distribution of braking force to the front/rear.

$$PFL=PFR=Pm \tag{Eq. 6}$$

$$PRL=PRR=Pmr \tag{Eq. 7}$$

Also, if deviation flag Fd=1, differences ΔPf and ΔPr in braking force between the left/right wheels may be computed to enable correction of the travel path in the direction to prevent deviation.

A judgment may be made as to whether target yaw moment Ms exceeds prescribed value Ms1. As shown below, if the judgment result is Ms<Ms1, the difference ΔPf in braking force between left/right wheels at the front and the difference ΔPr in braking force between left/right wheels at the rear may be computed. Here, T represents the tread, which for convenience is taken to be the same for the front/rear sides. Also, KR represents the coefficient for converting braking force into hydraulic pressure for the rear wheels, and it may be determined from the various braking parameters.

$$\Delta Pf=0 \tag{Eq. 8}$$

$$\Delta Pr=2 \times KR \times |Ms|/T \tag{Eq. 9}$$

On the other hand, if the judgment result is Ms≧Ms1, as shown below, the difference in braking force between the left/right wheels at the front ΔPf and the difference in braking force between the left/right wheels at the rear ΔPr may be computed. Here, KF represents the coefficient for converting braking force into hydraulic pressure for the front wheels, and it may be determined from the various braking parameters.

$$\Delta Pf=2 \times KF \times (|Ms|-Ms1)/T \tag{Eq. 10}$$

$$\Delta Pr=2 \times Kr \times Ms1/T \tag{Eq. 11}$$

Consequently, when the deviation direction is to the left, in order to apply the yaw moment to the right, target hydraulic pressures PFL to PRR may be computed as shown below. Also, when the deviation direction is to the right, left/right may simply be swapped in order to apply the yaw moment to the left.

$$PFL=Pm \tag{Eq. 12}$$

$$PFR=Pm+\Delta PF \tag{Eq. 13}$$

$$PRL=Pmr \tag{Eq. 14}$$

$$PRR=Pmr+\Delta Pr \tag{Eq. 15}$$

Figure 6:
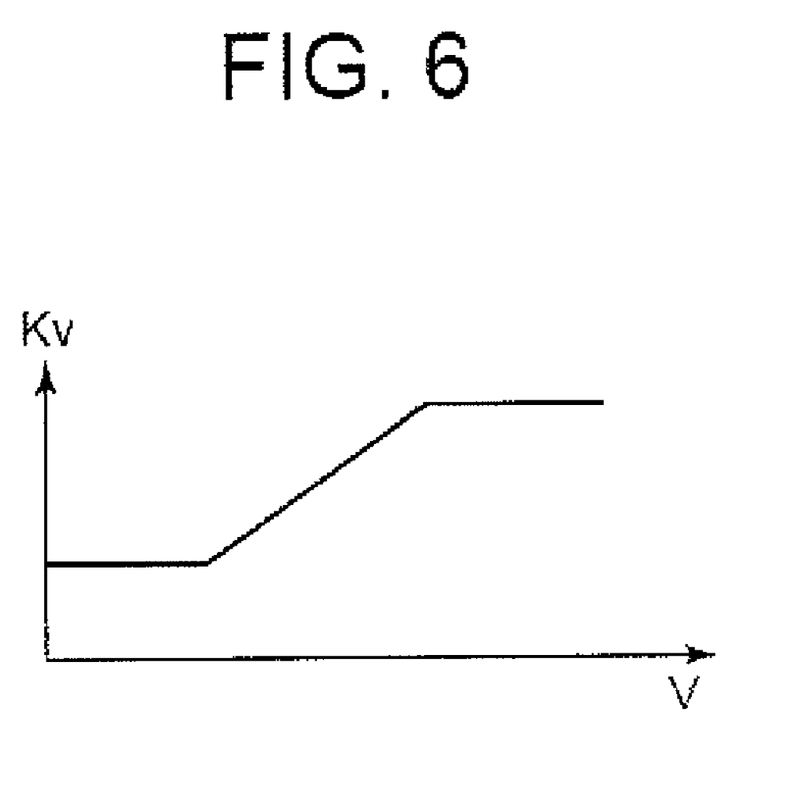
FIG. 6 is a map for computing gain Kv with respect to V.

When the deceleration flag Fr=0, said target hydraulic pressures PFL to PRR may be used. When said deceleration flag Fr=1, increment Pg of the braking force may be computed as shown below in order to perform deceleration. Here, Kv is the gain determined corresponding to vehicle speed V. For example, as shown in FIG. 6, the higher the vehicle speed V, the larger the value of Kv may be. Also, Kg may be the gain determined from the various parameters of the vehicle.

$$Pg=Kv \times Kg \times (|Xs|-XL-Xa) \tag{Eq. 16}$$

Consequently, when the deviation flag Fr=1, target hydraulic pressures PFL to PRR of the various wheel cylinders may be computed as shown below. Here, Pgr represents the increment for the rear wheels based on the ideal distribution of braking force between the front/rear wheels.

$$PFL=Pm+(Pg/2) \tag{Eq. 17}$$

$$PFR=Pm+\Delta Pf+(Pg/2) \tag{Eq. 18}$$

$$PRL=Pmr+(Pgr/2) \tag{Eq. 19}$$

$$PRR=Pmr+\Delta Pr+(Pgr/2) \tag{Eq. 20}$$

Brake actuator 3 may then adjusted by control 4 to generate target hydraulic pressures PFL to PRR for the various wheel cylinders. At the same time, warning device 20 may be turned ON, and the driver may be notified of the tendency of the vehicle to deviate from the lane of travel. Then processing may return to the prescribed main program.

When the deceleration flag Fr=1, not only may the braking force increased, but also the output power of the engine may be reduced to reduce the driving force.

When correction of the travel path is performed in the direction to prevent deviation, there may be no need to issue a warning at the same time. Instead, the following scheme may be adopted: for estimated lateral displacement Xs, a threshold for issuing a warning and a threshold for performing correction of the travel path may be prepared individually, and the warning threshold may be made relatively lower, so that a warning is issued before beginning correction of the travel path.

As explained above, the processing of steps S3, S5, S7 may correspond to the "lane deviation prevention controller," the processing of step S6 may correspond to the "deviation prevention control canceling device," and the map shown in FIG. 5 may correspond to the "threshold adjusting device." Also, target yaw moment Ms may correspond to the "applied yaw moment," and steering angle θ may correspond to the "steering operation magnitude." Also, the processing of step S3 may correspond to the "lateral displacement estimating device."

In the following, the operation and effects will be explained.

Figure 7:
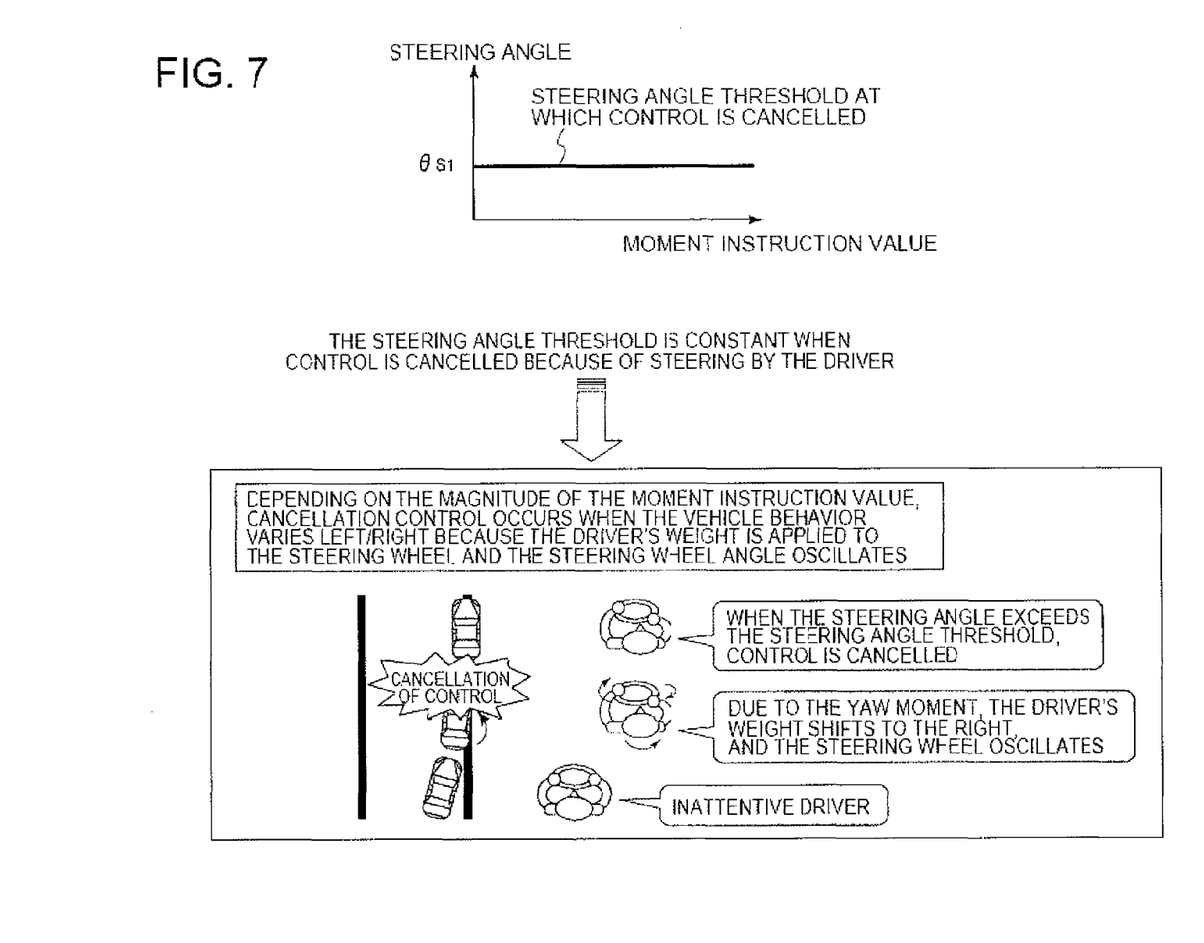
FIG. 7 is a diagram illustrating the problems of the prior art.

As shown in FIG. 7, it may be assumed that the tendency of the vehicle to deviate to the right has been detected. As a result, when deviation prevention control is initiated, yaw moment Ms to the left may be generated due to the difference in braking force between the left/right wheels. As a result, a lateral acceleration may be generated, and the driver's body may swing sideways. In this case, the shift of the driver's weight may be transmitted to the steering wheel such that steering angle θ exceeds threshold θs and the deviation prevention control may be cancelled although a steering operation was not intended by the driver.

Figure 8:
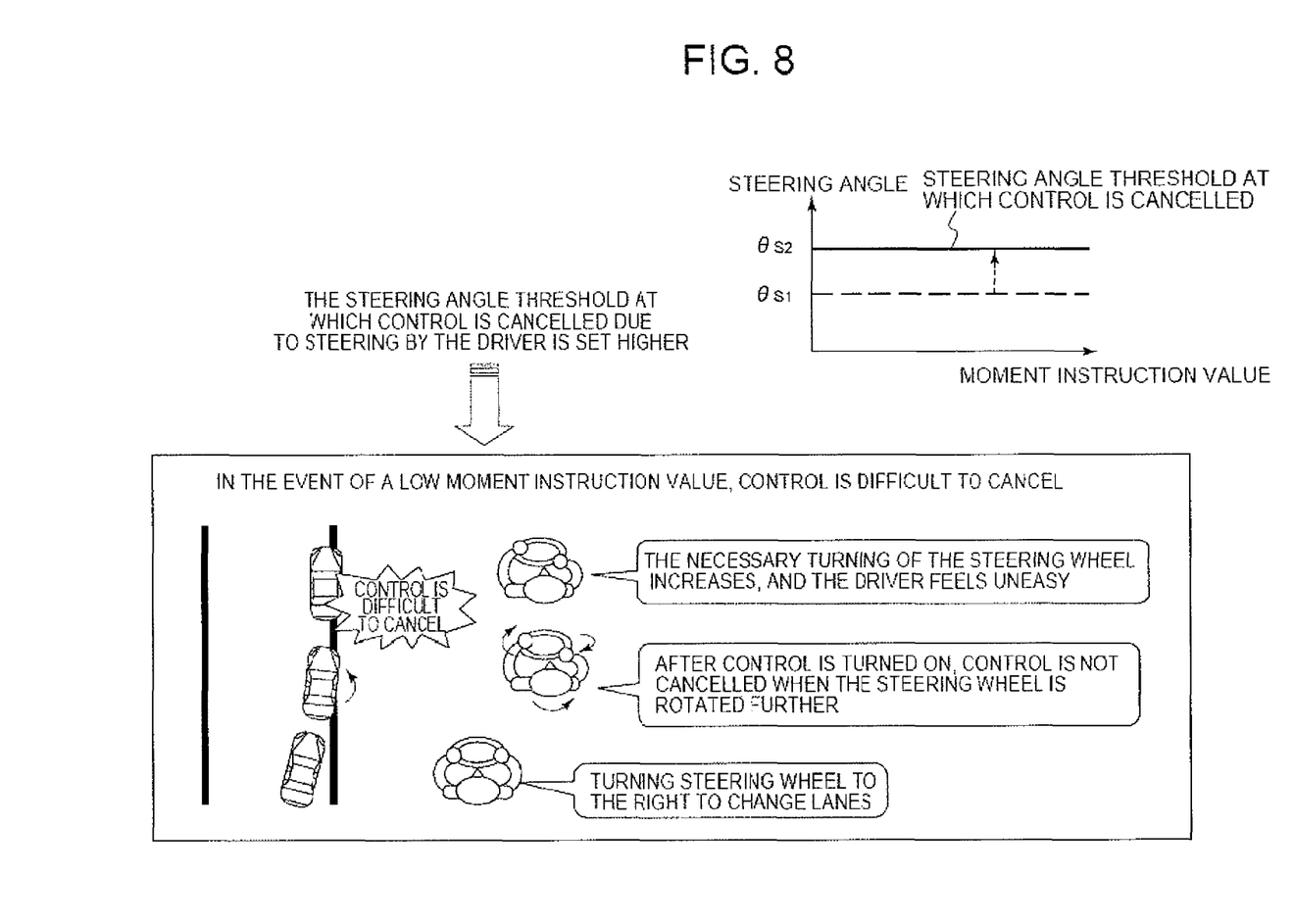
FIG. 8 is a diagram illustrating the problems of the prior art.

As one scheme, threshold θs may be fixed at a higher level. Although, as shown in FIG. 8, the driver may manipulate the steering wheel to perform an intended lane change, the deviation prevention control might still not be cancelled, and the driver may feel uncomfortable.

In this embodiment, threshold θs may be adjusted in conjunction with correction of the travel path due to the difference in braking force between the left/right wheels. That is, when target yaw moment Ms is generated (more strictly speaking, before the generation of a shift of the driver's weight), threshold θs with respect to steering angle θ may be adjusted according to the predicted shift in the driver's weight. Thus, threshold θs may be increased so that, although the driver's body swings sideways and steering angle θ increases due to the reaction to correction of the travel path, the likelihood of correctly distinguishing between intended and unintended steering operations may be greatly increased.

The larger the generated yaw moment Ms, the more significantly the driver's body swings sideways. Consequently, the larger the value of Ms, the larger the value of threshold θs. As a result, it may be possible to optimize threshold θs.

In this way, it may be possible to correctly judge whether or not the steering operation is intended. Consequently, it may be possible to avoid the following problems: although the steering operation is unintentional, the travel path correction may be cancelled unintentionally or, conversely, although the lane change is intended, it may be difficult to cancel correction of the travel path.

In this embodiment, when target yaw moment Ms is being computed (i.e., before target yaw moment Ms is actually applied), threshold θs may be adjusted according to said Ms. However, the present disclosure should not be limited to this scheme. For example, a scheme may also be adopted based on correspondence to yaw angular acceleration, lateral acceleration, etc., provided that threshold θs may be adjusted before the driver's body swings, and that the responsiveness can be guaranteed.

In this embodiment, deviation prevention control may be cancelled when steering angle θ exceeds the threshold. However, the present disclosure should not limited to this scheme. For example, a scheme may also be adopted in which deviation prevention control is cancelled when the steering angle variation or the steering torque exceeds a threshold. That is, according to the present disclosure, the "steering operation quantity" may include not only the steering angle, but also the steering angle variation, steering torque, and other status parameters pertaining to the steering operation.

In the aforementioned application example of FIG. 5, the larger the target yaw moment Ms, the larger the threshold θs. However, a scheme may also be adopted in which threshold θs increases with increasing estimated lateral displacement |Xs|.

That is, the abscissa (i.e., the x-axis) in FIG. 5 may represent estimated lateral displacement |Xs| instead of target yaw moment Ms.

Advantageously, selected embodiments in accordance with the present disclosure provide a type of lane deviation prevention controller to prevent a vehicle from deviating from a lane of travel when a tendency of the vehicle to deviate from the lane of travel is detected, correcting the vehicle's travel path in the direction to prevent deviation, and canceling the correction of the travel path when the steering operation magnitude of the driver exceeds a threshold, wherein the threshold can be adjusted during correction of the travel path. In one aspect, embodiments disclosed herein may correctly judge whether or not a steering operation by the driver is intentional. That is, when correction of the travel path is performed, the generation of a shift in the driver's weight resulting from the correction is taken into consideration, and it is possible that the steering operation magnitude has increased due to said shift in the driver's weight. Consequently, this increase in steering operation magnitude is taken into consideration in adjusting the threshold.

Additionally, in selected embodiments of the present disclosure, when correction of the travel path is performed, the steering operation magnitude threshold may be adjusted, so that even when the driver's body swings sideways, and the steering operation magnitude is thereby increased, due to the reaction to correction of the travel path, there is still no misjudgment whereby this is interpreted as an intentional steering operation. As a result, it may be possible to correctly judge whether or not a steering operation is intentional, and it is thus possible to avoid the problem of an unintended cancellation of correction of the travel path when the steering operation is unintended.

While the disclosure has been presented with respect to a limited number of embodiments, those skilled in the art, having benefit of this disclosure, will appreciate that other embodiments may be devised which do not depart from the scope of the present disclosure. Accordingly, the scope of the disclosure should be limited only by the attached claims.

What is claimed is:

1. A deviation controller to prevent deviation of a vehicle from a lane of travel, the deviation controller comprising:
   a detecting device configured to detect a tendency of the vehicle to deviate from the lane of travel;
   a prevention controller configured to apply a yaw moment to correct a travel path of the vehicle when the tendency of the vehicle to deviate from the lane of travel is detected;
   a correction canceling device configured to cancel the yaw moment of the prevention controller when a steering angle exceeds a canceling threshold; and
   a threshold adjusting device configured to adjust the canceling threshold in response to the yaw moment applied by the prevention controller,
   wherein the threshold adjusting device is configured to raise the canceling threshold as the yaw moment applied by the prevention controller increases.

2. The deviation controller of claim 1, wherein the threshold adjusting device is configured to:
   set the canceling threshold at a constant when the applied yaw moment is lower than a prescribed level; and
   raise the canceling threshold when the applied yaw moment exceeds the prescribed level.

3. A deviation controller to prevent deviation of a vehicle from a lane of travel, the deviation controller comprising:
   a displacement estimator configured to estimate a future lateral displacement of the vehicle with respect to the lane of travel;
   a detecting device configured to detect a tendency of the vehicle to deviate from the lane of travel;
   a prevention controller configured to apply a yaw moment to correct a travel path of the vehicle when the tendency of the vehicle to deviate from the lane of travel is detected;
   a correction canceling device configured to cancel the yaw moment of the prevention controller when a steering angle exceeds a canceling threshold; and
   a threshold adjusting device configured to adjust the canceling threshold in response to the estimated future lateral displacement,
   wherein the threshold adjusting device is configured to raise the canceling threshold as the yaw moment applied by the prevention controller increases.

4. The deviation controller of claim 3, wherein the threshold adjusting device is configured to raise the canceling threshold when the estimated future lateral displacement increases.

5. The deviation controller of claim 3, wherein the threshold adjusting device is configured to:
   set the canceling threshold to a constant when the estimated future lateral displacement is lower than a prescribed level; and
   increase the canceling threshold as the estimated future lateral displacement exceeds the prescribed level.

6. A method to prevent deviation of a vehicle from a lane of travel, comprising:
   estimating a future lateral displacement of the vehicle with respect to the lane of travel;
   detecting a tendency of the vehicle to deviate from the lane of travel;
   applying a yaw moment to correct a travel path of the vehicle in response to the detected tendency to deviate from the lane of travel;

canceling the applied yaw moment when a steering angle of the vehicle exceeds a canceling threshold;

adjusting the canceling threshold in response to the estimated future lateral displacement; and raising the canceling threshold as the applied yaw moment increases.

7. The method of claim 6, further comprising raising the canceling threshold when the estimated future lateral displacement increases.

8. The method of claim 6, further comprising setting the canceling threshold to a constant when the estimated future lateral displacement is lower than a prescribed level.

9. The method of claim 8, further comprising raising the canceling threshold as the estimated future lateral displacement exceeds the prescribed level.

10. A vehicle control system, comprising:

a detecting device to detect a tendency of the vehicle to deviate from a lane of travel;

a prevention controller configured to apply a yaw moment to correct a travel path of the vehicle when the tendency to deviate from the lane of travel is detected;

a correction canceling device configured to cancel the yaw moment of the prevention controller when a steering angle exceeds a canceling threshold; and a threshold adjusting device configured to adjust the canceling threshold in response to the yaw moment applied by the prevention controller, wherein the threshold adjusting device is configured to raise the canceling threshold as the yaw moment applied by the prevention controller increases.

11. The vehicle control system of claim 10, wherein the threshold adjusting device is configured to:

set the canceling threshold at a constant when the applied yaw moment is lower than a prescribed level; and raise the canceling threshold when the applied yaw moment exceeds the prescribed level.

12. The vehicle control system of claim 10, further comprising:

a displacement estimator configured to estimate a future lateral displacement of the vehicle with respect to the lane of travel; and wherein the threshold adjusting device is further configured to adjust the canceling threshold in response to the estimated future lateral displacement.

13. The vehicle control system of claim 12, wherein the threshold adjusting device is configured to raise the canceling threshold when the estimated future lateral displacement increases.

14. The vehicle control system of claim 12, wherein the threshold adjusting device is configured to:

set the canceling threshold to a constant when the estimated future lateral displacement is lower than a prescribed level; and increase the canceling threshold as the estimated future lateral displacement exceeds the prescribed level.

* * * * *